United States Patent
Gilfix et al.

(10) Patent No.: US 8,260,944 B2
(45) Date of Patent: Sep. 4, 2012

(54) USING A STATE MACHINE EMBEDDED WITHIN A SESSION INITIATION PROTOCOL (SIP) SERVLET TO IMPLEMENT AN APPLICATION PROGRAMMING INTERFACE (API)

(75) Inventors: Michael A. Gilfix, Austin, TX (US); Victor S. Moore, Lake City, FL (US); Vishwanath Narayan, Boca Raton, FL (US); Mark Pozefsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 11/851,906

(22) Filed: Sep. 7, 2007

(65) Prior Publication Data
US 2009/0070790 A1    Mar. 12, 2009

(51) Int. Cl.
G06F 15/16    (2006.01)
G06F 15/167    (2006.01)
G06F 15/177    (2006.01)
G06F 15/173    (2006.01)
G06F 3/00    (2006.01)
G06F 9/44    (2006.01)
G06F 9/46    (2006.01)
G06F 13/00    (2006.01)

(52) U.S. Cl. ........ 709/230; 709/220; 719/311; 719/313; 719/315

(58) Field of Classification Search ........................ None
See application file for complete search history.

(56) References Cited

U.S. PATENT DOCUMENTS

2005/0044188 A1    2/2005    Nakazawa et al.
2006/0047840 A1    3/2006    Postmus
2006/0239247 A1    10/2006    Postmus

OTHER PUBLICATIONS

Anders Kristensen, SIP Servlet API Version 1.0, Feb. 4, 2003, pages—Title page, pp. xi, 1-4, 9, 14, 15, 17, 24, 35, 63.*
David A. Chappell, Enterprise Service Bus, Jun. 2004, pp. Introduction (pdf p. 2), p. 14.*
Peter V. Mikhalenko, SCXML: State machine notation and voice application development, Mar. 29, 2006.*
Uche Ogbuji, WSDL processing with XSLT, Nov. 1, 2000.*
Sumner, Roger, "We're Closing in on the Jetsons," Aspect Contact Center, Unplugged Blog, Oct. 11, 2006.

* cited by examiner

*Primary Examiner* — Andy Ho
*Assistant Examiner* — Craig Dorais
(74) *Attorney, Agent, or Firm* — Patents on Demand P.A.; Brian K. Buchheit; Scott M. Garrett

(57) ABSTRACT

The present invention discloses a system for implementing a software application programming interface (API) within a session initiation protocol (SIP) servlet. Such a system can utilize a state machine, a SIP servlet configured to execute the state machine, and an enterprise service bus (ESB). The state machine can be configured to send and receive a series of communications and can be defined in a definition document. The series of communications can represent the execution of a software function defined within an API. The SIP servlet can select a state machine based upon an indicator contained within a received SIP message. The ESB can be configured to execute a system function in response to communications with the state machine.

19 Claims, 3 Drawing Sheets

USING A STATE MACHINE EMBEDDED WITHIN A SESSION INITIATION PROTOCOL (SIP) SERVLET TO IMPLEMENT AN APPLICATION PROGRAMMING INTERFACE (API)

BACKGROUND

1. Field of the Invention

The present invention relates to the field of Application Programming Interface (API) implementation and, more particularly, to implementing an API utilizing a state machine embedded within a session initiation protocol (SIP) servlet.

2. Description of the Related Art

Application programming interfaces (APIs) exist as an abstraction that provides software programmers with a simple and standardized means of utilizing the functions or services of another software application, such as an operating system. An API specification represents a high-level definition of the interface or calling conventions without concern for the details of the actual implementation within the software system. Typically, an API is implemented as a software program or an additional code file, such as a dynamically linked library (.DLL) file, that translates a programmer's use of the conventions defined in the API into the lower-level code necessary to perform the selected functionality.

For example, in a WINDOWS environment, a programmer can access system functions, such as an error beep, by including the appropriate .DLL file and function call within the application's source code. A software programming environment, such as an integrated development environment (IDE), often provides a programmer with the syntax required for the inclusion of the .DLL file and function call and can make the implementation of the API transparent.

However, the complexity of the API and its implementation increases with the complexity of the computing system and the number of additional protocols used. In a service-oriented architecture (SOA), the use of the Session Initiation Protocol (SIP) relies upon timed messaging between distributed computing components in order to execute system functions. This added complexity often requires a programmer to have in-depth knowledge of how a specific API implementation behaves in order to ensure that applications perform as desired. Further, a programmer may also need to understand the functional capabilities of the underlying system components and the communication requirements between the components. Such a situation nullifies the simplicity provided by the API.

What is needed is a solution that provides a programmer with a higher level abstraction for API implementation within a complex computing system that uses SIP. That is, the solution would use an automated process to manage the SIP messaging necessary to implement an API specification. Ideally, such a solution would utilize a state machine within a SIP servlet to implement the functionality of the API and communicate with an enterprise service bus (ESB) to perform the requested operation.

SUMMARY OF THE INVENTION

The present invention discloses a system for implementing an application programming interface (API) specification as a state machine embedded within a session initiation protocol (SIP) servlet. That is, the functions defined within the API specification can be expressed as the states and state transitions of a state machine instead of more conventional approaches. The state machine can initiate a series of communications with an enterprise service bus (ESB) to accomplish the functionality requested in a SIP message received by the SIP servlet. The SIP servlet can utilize message template processing documents and Web services definition documents to handle the series of communications for the state machine.

The present invention can be implemented in accordance with numerous aspects consistent with the material presented herein. For example, one aspect of the present invention can include a system for implementing a software application programming interface (API) within a session initiation protocol (SIP) servlet. Such a system can utilize a state machine, a SIP servlet configured to execute the state machine, and an enterprise service bus (ESB). The state machine can be configured to send and receive a series of communications and can be defined within a definition document. The series of communications can represent the translation of a SIP message into functions defined by an application programming interface (API). The SIP servlet can select a state machine based upon the received SIP message. The ESB can be configured to execute one or more system functions in response to communications with the state machine.

Another aspect of the present invention can include a method for utilizing a state machine implementation of an application programming interface (API) embedded within a session initiation protocol (SIP) servlet. Such a method can begin with a SIP servlet receiving a SIP message that requires API functions for successful processing. The SIP servlet can then select a state machine definition document that corresponds to the received SIP message. Next, the SIP servlet can invoke the state machine using the state machine definition document. The state machine can then initiate a series of communications between the SIP servlet and an enterprise service bus (ESB). The series of communications can represent the successful processing of the SIP message by the API, causing the ESB to execute a corresponding series of system functions.

Still another aspect of the present invention can include an application programming interface (API). The API can include at least one state machine definition document and at least one message template processing document. A state machine definition document can be configured for execution by a Session Initiation Protocol (SIP) servlet. Further, the definition document can define a series of communications and a state flow for implementing an API specification. A message template processing document can be configured to provide the SIP servlet with a predefined template for messages sent by the servlet.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
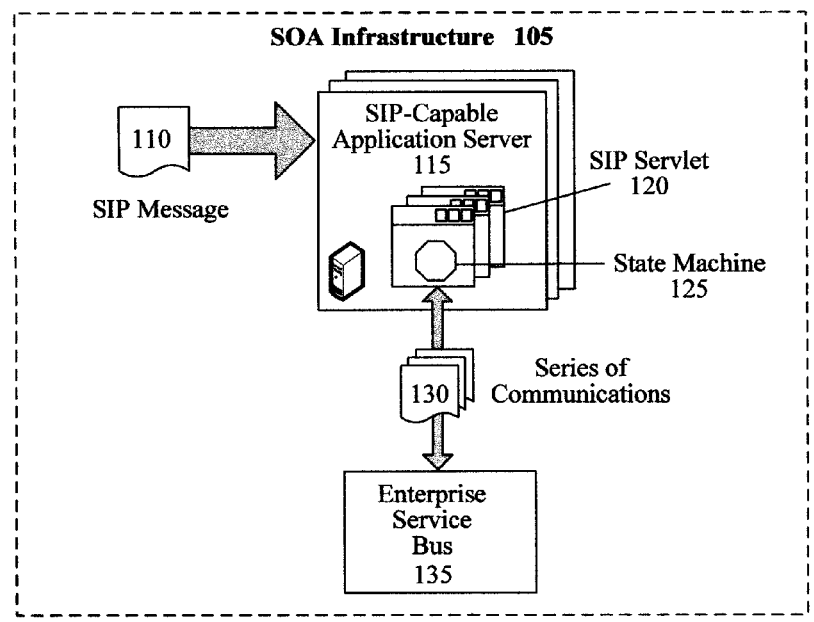
FIG. 1 is a schematic diagram of a system for implementing an application programming interface (API) as a state machine embedded within a session initiation protocol (SIP) servlet in accordance with embodiments of the inventive arrangements disclosed herein.

FIG. 1 is a schematic diagram of a system 100 for implementing an application programming interface (API) as a state machine 125 embedded within a session initiation protocol (SIP) servlet 120 in accordance with embodiments of the inventive arrangements disclosed herein. It should be noted that system 100 emphasizes the interaction between a SIP-capable application server 115 and an enterprise service bus (ESB) 135 within a service oriented architecture (SOA) infrastructure 105 and that the SOA infrastructure can include additional components that support other functions. As such, only components that are particularly relevant to the present invention have been included in this figure.

The SOA infrastructure 105 can be a computing system utilizing computing components typical in conventional SOA implementations including components that can support SIP communications. One or more networks (not shown) can convey communications between components of the SOA infrastructure 105.

In this example, the SIP-capable application server 115 can receive a SIP message 110. The SIP message 110 can contain data in a format already defined within a SIP specification and can be sent from any component within the SOA 105 that can act as a user agent client (UAC). An indicator (not shown) can be included within the message 110 indicating which supported API to use when processing the message 110. For example, the SIP message 110 can indicate that the JSR 116 API specification should be used for processing.

Upon receipt of the SIP message 110, the SIP-capable application server 115 can execute internal rules for the selection of a SIP servlet 120 to handle the message 110. The SIP servlet 120 can be a software application designed to handle specific SIP tasks for the application server 115. The selected servlet 120 can invoke a state machine 125 that corresponds to the appropriate API to process the SIP message 110.

It should be noted that the use of a state machine 125 to implement an API within a servlet 120 is currently not done within conventional SOA infrastructures 105. Use of a state machine 125 is of particular note because the complexities of the API implementation can be hidden from a programmer utilizing the system. That is, a state machine 125 implementation allows for a simpler interface between a programmer and the system, as well as between the SIP servlet 120 and ESB 135.

The state machine 125 can generate a series of communications 130 with the ESB 135. The series of communications 130 can comprise a sequence of messages sent by the SIP servlet 120 to the ESB 135 and responses from the ESB 135 back to the SIP servlet 120. The successful series of communications 130 can represent the execution of one or more API functions necessary to handle the SIP message 110. The status of the state machine 125 can change based on the contents of messages within the series of communications 130. For example, the status of the state machine 125 can change from "Waiting" to "Sending" if a response is not received from the ESB 135 within an allotted time frame.

The ESB 135 can represent the communications infrastructure between the additional and/or distributed components of the SOA infrastructure 105. The ESB 135 can execute lower-level and/or system-level functions in response to communications 130 received from the SIP servlet 120.

Figure 2:
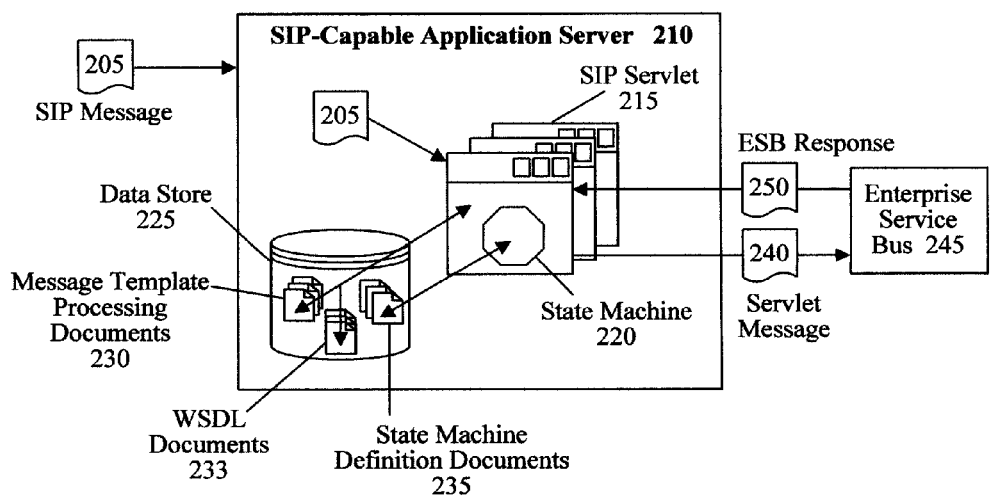
FIG. 2 is a schematic diagram of a system providing further details of an application programming interface (API) implementation utilizing a state machine embedded within a session initiation protocol (SIP) servlet in accordance with an embodiment of the inventive arrangements disclosed herein.

FIG. 2 is a schematic diagram of a system 200 providing further details of an application programming interface (API) implementation utilizing a state machine 220 embedded within a session initiation protocol (SIP) servlet 215 in accordance with an embodiment of the inventive arrangements disclosed herein. System 200 can be a detailed extension of system 100 or any other system utilizing a service oriented architecture (SOA) infrastructure and an embedded state machine within a SIP servlet as an API implementation.

In system 200, a SIP message 205 can be received by a SIP-capable application server 210. As in system 100, the SIP message 205 can represent a typical SIP transmission. The SIP-capable application server 210 can route the SIP message 205 to an appropriate SIP servlet 215 for handling.

The SIP servlet 215 can invoke a state machine 220 by selecting and executing a state machine definition document 235. The state machine definition document 235 can define the states and actions of the state machine 220. Selection of a state machine definition document 235 by the SIP servlet 215 can be based upon the type of SIP message 205 received and/or an indicator (not shown) contained within the SIP message 205. Thus, multiple definition documents 235 can exist, each for a different type of SIP message 205 and/or API function being implemented.

When the state machine 220 requires the servlet 215 to transmit a message 240 to the enterprise service bus (ESB) 245, a message template processing document 230 can be used as a guideline. Multiple message template processing documents 230 can exist to accommodate the different messages 240 required. In the case where the SIP message 205 requires interaction with a Web service, the SIP servlet 215 can further modify the outgoing servlet message 240 by applying a Web services definition language (WSDL) document 233.

The state machine definition documents 235, message template processing documents 230, and the WSDL documents 233 can be contained within a data store 225 accessible by the SIP servlet 215. In this example, the data store 225 is a component of the application server 210. In an alternate embodiment, the data store 225 can be remotely located from the application server 210 and accessed via a network (not shown).

It should be noted that the use of specialized documents to define the state machine 220 and communications with the ESB 245 imparts a new flexibility and simplicity for maintaining the API implementation. Conventional API implementations require base code changes when the API specification changes. A state machine 220 implementation of an API specification allows changes to be easily integrated into the existing system; only the documents affected by the specification change need be modified.

Additionally, a state machine definition document can express the meaning of the API using plain language terms that better describe behavior and improve readability and understanding. Therefore, a state machine implementation can alleviate many of the complexities and ambiguities encountered by programmers utilizing conventional API implementations.

In response to the servlet message 240, the ESB 245 can perform specified actions and transmit an ESB response 250. The ESB response 250 can contain information that can cause a state transition within the state machine 220 and additional messages 240 and responses 250.

As used herein, presented data stores, including store 225 can be a physical or virtual storage space configured to store digital information. Data store 225 can be physically implemented within any type of hardware including, but not limited to, a magnetic disk, an optical disk, a semiconductor memory, a digitally encoded plastic memory, a holographic memory, or any other recording medium. Data store 225 can be a stand-alone storage unit as well as a storage unit formed from a plurality of physical devices. Additionally, information can be stored within data store 225 in a variety of manners. For example, information can be stored within a database structure or can be stored within one or more files of a file storage system, where each file may or may not be indexed for information searching purposes. Further, data store 225 can utilize one or more encryption mechanisms to protect stored information from unauthorized access.

Figure 3:
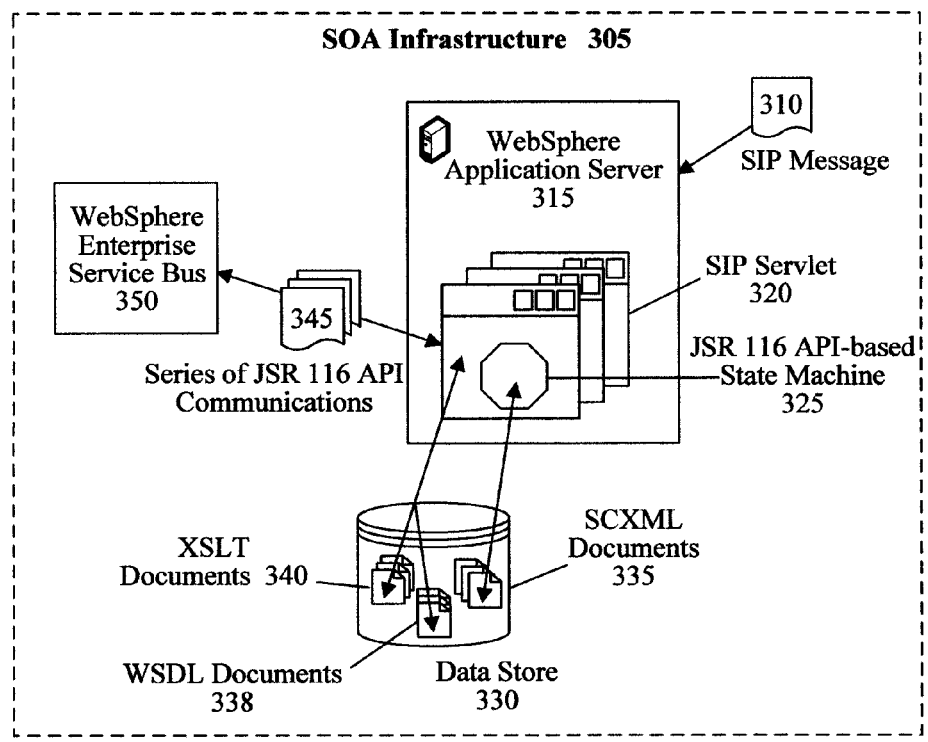
FIG. 3 is a schematic diagram of a system illustrating a specific implementation for implementing an application programming interface (API) by embedding a state machine within a session initiation protocol (SIP) servlet in accordance with an embodiment of the inventive arrangements disclosed herein.

FIG. 3 is a schematic diagram of a system 300 illustrating a specific implementation for implementing an application programming interface (API) by embedding a state machine 325 within a session initiation protocol (SIP) servlet 320 in accordance with an embodiment of the inventive arrangements disclosed herein. System 300 illustrates the implementation of the JSR 116 API within a service oriented architecture (SOA) infrastructure 305 utilizing WebSphere components.

A WebSphere application server 315 can receive a SIP message 310, which is optionally processed by a set of WebSphere interceptors for security, transaction, and so forth. The optionally processed message 310 can be routed to an appropriate SIP servlet 320. In this example, handling of the SIP message 310 requires utilizing the JSR 116 API. Therefore, the SIP servlet 320 retrieves the state chart extensible markup language (SCXML) document 335 that expresses the requested JSR 116 API function(s) from a data store 330 and executes the SCXML document 335 to handle the message 310.

The JSR 116 API-based state machine 325 can initiate a series of JSR 116 API communications 345 with the WebSphere enterprise service bus (ESB) 350 to execute API functions. To formulate outgoing messages, the servlet 320 can utilize various extensible stylesheet language transformations (XSLT) documents 340 and Web services definition language (WSDL) documents 338, also contained in data store 330.

Figure 4:
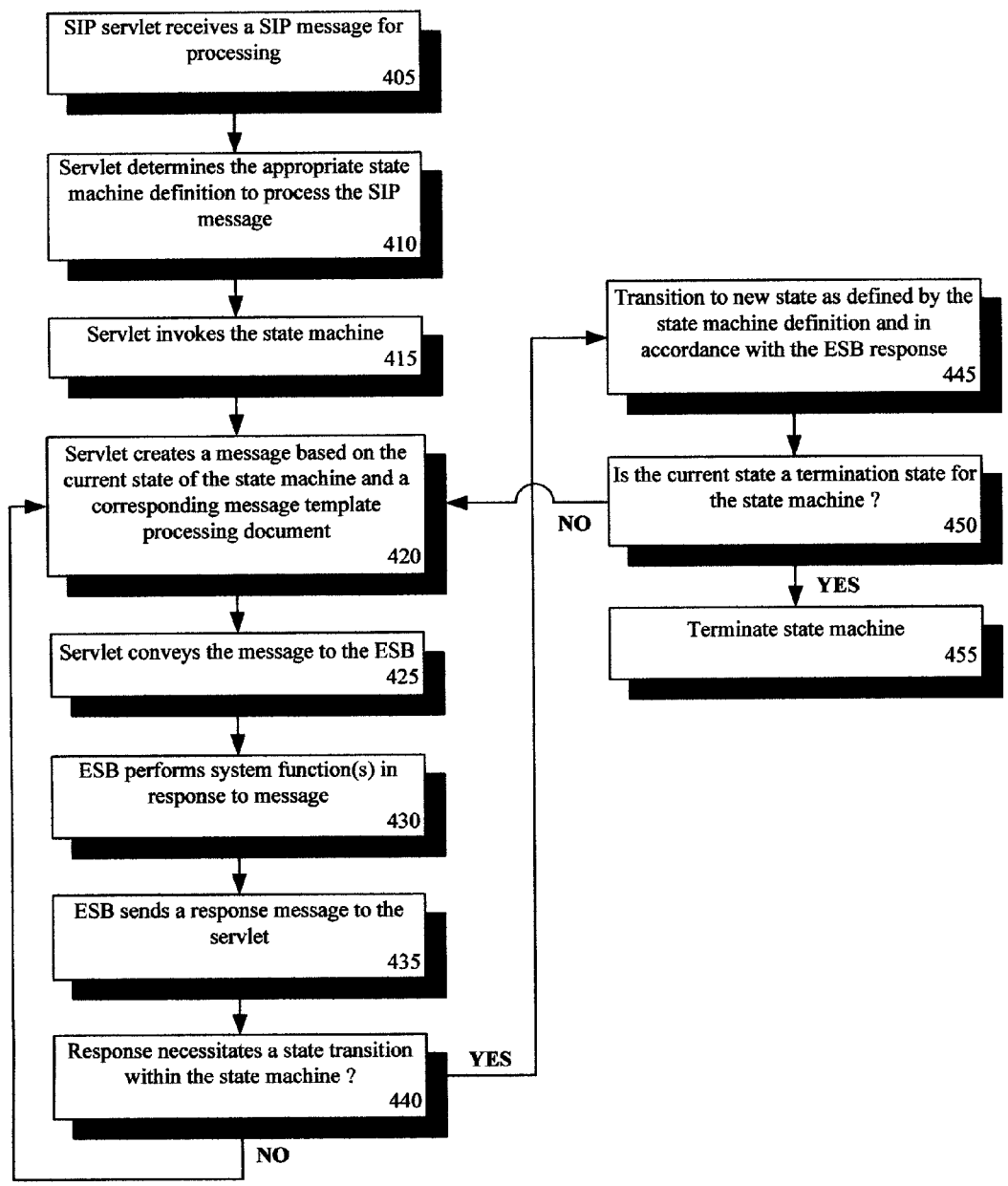
FIG. 4 is a flow chart of a method for utilizing a state machine embedded within a session initiation protocol (SIP) servlet in accordance with an embodiment of the inventive arrangements disclosed herein.

FIG. 4 is a flow chart of a method 400 for utilizing a state machine embedded within a session initiation protocol (SIP) servlet in accordance with an embodiment of the inventive arrangements disclosed herein. Method 400 can be performed within the context of system 100, 200, 300, or any other system capable of using an API implemented as an embedded state machine within a SIP servlet.

Method 400 can begin with step 405 where a SIP servlet can receive a SIP message for processing. The SIP servlet can determine the state machine definition to use to process the message in step 410. In step 415, the state machine can be invoked.

The servlet can create a message based on the current status of the state machine and a message template processing document in step 420. In step 425, the servlet can convey the message of step 420 to the enterprise service bus (ESB).

The ESB can perform one or more system functions in response to the conveyed message in step 430. Upon completion of the system function(s), the ESB can send a response message back to the servlet in step 435. In step 440, the state machine can determine if the response received from the ESB necessitates a state transition.

When a state transition is not necessary, flow returns to step 420. This branch can represent the case where a communications failure has occurred and a message must be resent. When a state transition is required, step 445 can execute where the state machine transitions to the new state as defined in the state machine definition document and in accordance with the ESB response. For example, a current state can be defined as branching to multiple states based upon the contents of the ESB response (e.g., response="Good" transition to state="Invite", response="Bad" transition to state="Retry").

Once state transitioning is complete, it can be determined if the current state, which is the new state transitioned to in step 445, is a terminating state for the state machine in step 450. When the current state is a terminating state, then the state machine can be terminated in step 455. Otherwise, flow can return to step 420 for continued processing until a termination state is reached.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for implementing a software application programming interface (API) within a computing environment utilizing session initiation protocol (SIP) comprising:
   a plurality of state machine definition documents, each corresponding to a specific function of a SIP Servlet application program interface (API), wherein each state machine definition document is written using a markup language that includes standardized language elements for state diagram notations, and wherein each state machine definition document defines the series of messages, the series of responses, and a state flow for implementing the corresponding application programming interface (API) function;

at least one state machine, comprising computer program instructions able to be executed by at least one processor that are stored in at least one non-transitory storage medium, configured to send a series of messages and receive a series of responses, wherein the sent series of messages represents a translation of a received SIP message into one or more functions defined by a SIP Servlet application programming interface (API) specification, each of the one or more functions corresponding to one of the state machine definition documents;

a session initiation protocol (SIP) servlet, comprising computer program instructions able to be executed by at least one processor that are stored in at least one non-transitory storage medium, configured to execute the at least one state machine and to utilize one of the state machine definition documents for each SIP servlet API function call; and an enterprise service bus (ESB) configured to receive the series of messages from the state machine and send the series of responses to the state machine, wherein the ESB executes one or more system functions for each received message, and wherein responses sent to the state machine selectively change a state of the state machine in accordance with the state flow defined by the state machine definition document active for a given SIP servlet API function call for which an instance of the state machine is executing, wherein the SIP Servlet is able to be configured to conform to changes to the SIP servlet API specification by changing markup of one or more of the state machine definition documents without making base code changes to the SIP Servlet as opposed to conventional API implementations that require base code changes when the API specification changes.

2. The system of claim 1, wherein the enterprise service bus (ESB) and session initiation protocol (SIP) servlet are components of a service oriented architecture (SOA).

3. The system of claim 1, wherein a sent message is formulated using data contained within the received SIP message and a message template processing document, wherein the template processing document used is selected from a set of message template processing documents.

4. The system of claim 3, wherein the message template processing document is written in an extensible markup language (XML) based markup language for creating a transformed document from an original XML document, where the transformed document is based on content of the original XML document.

5. The system of claim 3, wherein the SIP servlet modifies a formulated message using a standard XML-based language that provides a model for describing Web services.

6. The system of claim 3, wherein the message template processing document is an extensible stylesheet language transformations (XSLT) based document, wherein the SIP servlet modifies a formulated message using a Web services descriptor language (WSDL) based document, and wherein the set of XSLT documents and the WSDL document are contained within a data store accessible by the SIP servlet.

7. The system of claim 1, wherein the API specification conforms to a Java Specification Request (JSR) based standard.

8. A method for utilizing a state machine to implement an application programming interface (API) within a computing environment utilizing the session initiation protocol (SIP) comprising:

maintaining in a non-transitory storage medium, a plurality of state machine definition documents, each corresponding to a specific function of a SIP Servlet application program interface (API), wherein each state machine definition document is written using a markup language, and wherein each state machine definition document defines the series of messages, the series of responses, and a state flow for implementing the corresponding application programming interface (API) function;

a session initiation protocol (SIP) servlet, comprising computer program instructions able to be executed by at least one processor that are stored in at least one non-transitory storage medium, receiving a SIP message, wherein the SIP message requires one or more functions defined by the SIP Servlet application programming interface (API) specification for successful processing;

selecting, via at least one processor executing computer program instructions stored in a non-transitory storage medium, one of the plurality of state machine definition documents that matches one or more processing requirements of the received SIP message by corresponding to a function of the SIP Servlet API that is called to satisfy the one or more processing requirements of the received SIP message;

invoking, via at least one processor executing computer program instructions stored in a non-transitory storage medium, a state machine from the selected state machine definition document; and the state machine initiating a series of communications between the SIP servlet and an enterprise service bus (ESB) in accordance with the state flow defined by the selected state machine definition document, wherein the ESB executes one or more system functions for each message received within the series of communications, wherein the series of communication represents a successful processing of the received SIP message by the API, wherein the messages are created in accordance with a current state of the state machine and a message template processing document, and wherein the message template processing document is selected from a set of message template processing documents, wherein the SIP Servlet is able to be configured to conform to changes to the SIP servlet API specification by changing markup of one or more of the state machine definition documents without making base code changes to the SIP Servlet as opposed to conventional API implementations that require base code changes when the API specification changes.

9. The method of claim 8, wherein the initiating step further comprises:

conveying, via at least one processor executing computer program instructions stored in a non-transitory storage medium, the message to the ESB;

receiving, via at least one processor executing computer program instructions stored in a non-transitory storage medium, a response from the ESB;

transitioning, via at least one processor executing computer program instructions stored in a non-transitory storage medium, the state machine to a new state based upon the response from the ESB and the definition document;

determining, via at least one processor executing computer program instructions stored in a non-transitory storage medium, whether a termination state of the state machine has been reached, wherein the termination state is defined within the state machine definition document; and when the termination state has not been reached, the steps of claim 9 are repeated until the termination state is reached.

10. The method of claim 9, further comprising: applying an XML-based document to the created message prior to conveyance to the ESB, wherein the XML-based document is written in a standard XML-based language that provides a model for describing Web services.

11. The method of claim 9, wherein the message template processing document is written in an XML-based markup language for creating a transformed document from an original XML document, where the transformed document is based on content of the original XML document.

12. The method of claim 8, wherein the state machine definition document is written using a markup language that includes standardized language elements for state diagram notations.

13. The method of claim 8, wherein the API specification implemented by the state machine conforms to a Java Specification Request (JSR) based standard.

14. The method of claim 8, wherein said steps of claim 8 are performed by at least one machine in accordance with at least one computer program stored in a computer readable media, said computer programming having a plurality of code sections that are executable by the at least one machine.

15. An application programming interface (API) stored in a non-transitory storage medium comprising:

a plurality of state machine definition documents digitally encoded in a non-transitory storage medium configured to be executed by a session initiation protocol (SIP) servlet, wherein the SIP servlet comprises a state machine to perform a series of communications and wherein each of the state machine definition documents defines the series of communications and a state flow for implementing a SIP Servlet application programming interface (API) specification, wherein each of the state machine definition documents corresponds to a specific function of the SIP Servlet application program interface (API), wherein each state machine definition document is written using a markup language, and wherein each state machine definition document defines the series of messages, the series of responses, and a state flow for implementing the corresponding application programming interface (API) function; and at least one message template processing document digitally encoded in a non-transitory storage medium configured to provide the SIP servlet with a predefined template for messages sent by the servlet as part of the series of communications wherein the SIP Servlet is able to configured to conform to changes to the SIP servlet API specification by changing markup of one or more of the state machine definition documents without making base code changes to the SIP Servlet as opposed to conventional API implementations that require base code changes when the API specification changes.

16. The API of claim 15, further comprising: a SIP servlet configured to execute the at least one state machine definition document and utilize the at least one message template processing document, wherein the SIP servlet contains one or more software algorithms for determining which state machine definition document and message template processing document to execute in response to the received SIP message.

17. The API of claim 15, wherein an enterprise service bus (ESB) is a party to the series of communications sent by the SIP servlet.

18. The API of claim 15, wherein the at least one state machine definition document is written using a markup language that includes standardized language elements for state diagram notations, and wherein the at least one message template processing document is written in an XML-based markup language for creating a transformed document from an original XML document, where the transformed document is based on content of the original XML document.

19. The API of claim 15, wherein the API specification implemented by the at least one state machine definition document conforms to a Java Specification Request (JSR) based standard.

* * * * *